March 30, 1926.

J. R. BOLDT ET AL 1,578,630

DUMP TRUCK

Filed Nov. 19, 1924

Inventors
J. R. Boldt
S. A. Ivanson
A. W. Melton

Patented Mar. 30, 1926.

1,578,630

UNITED STATES PATENT OFFICE.

JOHN R. BOLDT, SAMUEL A. RANSON, AND ALFRED W. MELLON, OF BLAIRSVILLE, PENNSYLVANIA.

DUMP TRUCK.

Application filed November 19, 1924. Serial No. 750,821.

*To all whom it may concern:*

Be it known that we, JOHN R. BOLDT, SAMUEL A. RANSON, and ALFRED W. MELLON, citizens of the United States, residing at Blairsville, in the county of Indiana and State of Pennsylvania, have invented certain new and useful Improvements in Dump Trucks, of which the following is a specification.

This invention relates to improvements in dump trucks, and has for its principal object to provide an apparatus for raising the forward end of the body of the truck, whereby the latter will be moved to a dumping position, so that the contents of the body may be discharged therefrom.

Another important object of the invention is to provide a dumping apparatus of the above mentioned character, wherein the motive power employed for operating the truck is also adapted to be employed for actuating the raising and lowering of the body.

A further object of the invention is to provide a dump truck of the above mentioned character, wherein means is provided for facilitating the operation of the dumping operation by the driver of the truck, thus obviating any necessity of the driver having to leave his seat, in order to raise or lower the body.

A further object of the invention is to provide a dump truck of the above mentioned character, which is simple in construction, inexpensive, strong and durable, and further well adapted for the purposes for which it is designated.

Other objects and advantages of this invention will become apparent during the following description.

In the accompanying drawing, forming a part of this specification, and in which like numerals designate like parts throughout the same:

Figure 1:
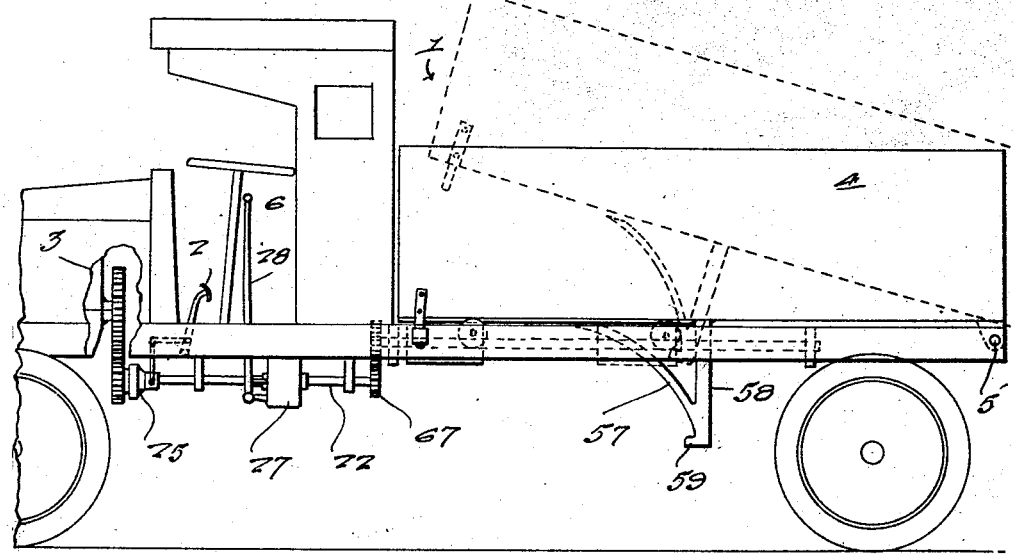
Figure 1 is a side elevation of a truck modified in accordance with the present invention, and showing the improved hoisting and dumping means associated therewith.
Figure 2:
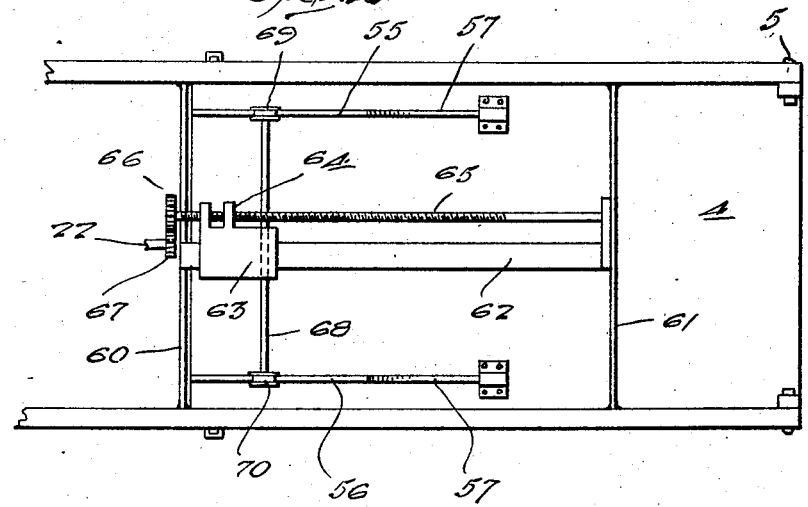
Fig. 2 is a fragmentary top plan view of the hoisting means, per se.

In Figures 1 and 2, of the drawings, the improved dumping apparatus is specifically illustrated. A pair of longitudinally extending tracks 55 and 56 respectively, are secured in spaced relation on the bottom of the body 4, in the manner as clearly illustrated. The rear ends of the tracks terminate in the cam portions 57, which extend downwardly from the bottom of the truck body, and bracing means, such as is illustrated at 58 is provided for each of the rear ends of the track. A stop 59 is further associated with the lower ends of each of the tracks, and the purpose thereof will hereinafter be more fully described.

Extending transversely across the sides of the chassis, are the cross bars 60 and 61 respectively.

A longitudinally extending bar 62 is arranged centrally between the cross bars 60 and 61, and provides a guide for the block 63, which is provided with an extension 64, the latter being threaded on the screw 65, which extends longitudinally of the chassis, and is journaled at its ends in the cross bars.

The block 63 is adapted for slidable movement on the bar 62, by means of the gear 66, carried by the forward end of the screw 65, and which meshes with a similar gear 67, carried by the rear end of the drive shaft 22. This drive shaft is journaled in appropriate bearings on the chassis of the truck and is associated with appropriate transmission mechanism 27 which is operated by the lever 28. There is also a clutch 25 connected thereto and this clutch is connected through the medium of the gearing shown with the motor 3. The clutch is controlled by the pedal 2. The parts 2 and 28 are conveniently operated by the driver who sits in the compartment 6.

A rod 68 is carried by the block 63, and extends transversely across the same. A pair of rollers 69 and 70 respectively are supported on the outer ends of the rod and are adapted for cooperation with the tracks 55 and 56, in the manner as clearly illustrated in Figure 2.

In operation, the block 63 is normally adjacent the cross bar 60, and the wheels on the rod 68 are disposed adjacent the forward ends of the tracks. When the screw 65 is rotated in one direction, the block 63 will travel rearwardly on the guide 62, causing a rearward movement of the rod 68 and simultaneously causing the rollers to travel rearwardly on the tracks. As the rollers reach the cam portions of the tracks, the same will force the body 4 upwardly into the position shown in the dotted lines in Figure 1, whereby the contents of the body 4 may be easily dumped. The stops 59 will limit the rearward movement of the rollers 69 and 70 and prevent the displacement of the same from the tracks. By reversing the rotation of the screw 65, the block 63 is returned to its normal position, simultaneously causing the rollers to move forwardly on the track, and permitting the dump body 4 to maintain its normal position on the chassis.

It will thus be seen from the foregoing description, that a dump truck has been provided, wherein the body may be raised or lowered, by associating the hoisting and lowering apparatus with the motor of the truck, the parts being so arranged as to enable the driver of the truck to control the actuation of the dumping apparatus. A dumping truck of the above mentioned character will, at all times, be positive and efficient in carrying out the purposes for which the same is designated, and furthermore considerable time and labor will be saved in operating the mechanism.

While we have shown the preferred embodiment of our invention, it is to be understood that various changes in the size, shape, and arrangement of parts may be resorted to, without departing from the spirit of the invention, and the scope of the appended claim.

Having thus described our invention, what we claim is:

A dumping apparatus for motor vehicles comprising in combination with the chassis of the vehicle and the motor, a dump body hinged on the rear end of the chassis, means operable by the motor for raising the forward end of the dump body to a dumping position, said means comprising a pair of longitudinally extending tracks secured in spaced relation on the bottom of the body, cam portions formed on the rear ends of the tracks and extending downwardly from the bottom of the body, a pair of spaced cross bars extending between the sides of the chassis, a rotatable screw extending between the cross bars and having its ends journaled therein, a block adapted for longitudinal movement on said screw, a transverse rod carried by said block, and rollers on the outer ends of said rod adapted for engagement with said tracks, said body adapted to be swung upwardly to a tilting position, when the rollers are in engagement with the cam portions of the tracks.

In testimony whereof we affix our signatures.

JOHN R. BOLDT.
SAMUEL A. RANSON.
ALFRED. W. MELLON.